(No Model.)
R. C. EATON.
BARBED PICKET FENCE.
No. 304,630. Patented Sept. 2, 1884.
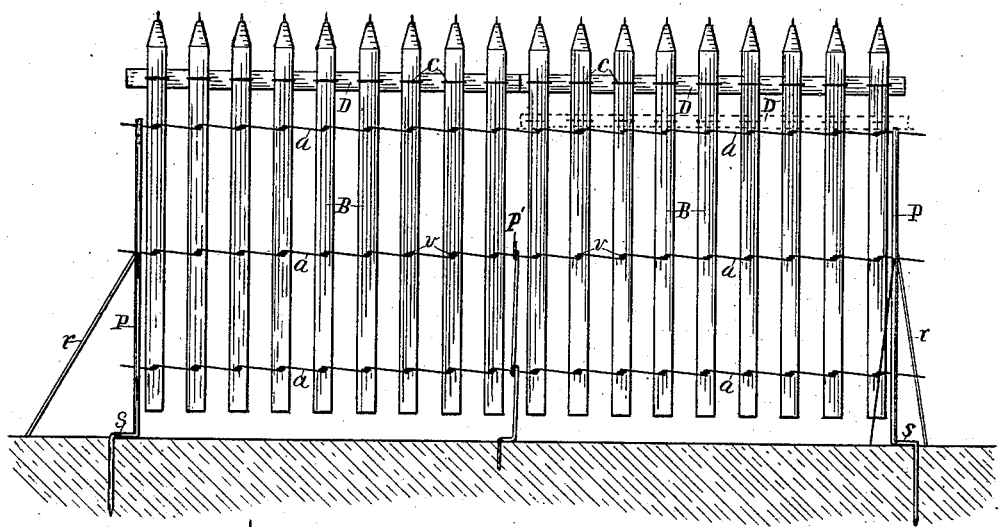
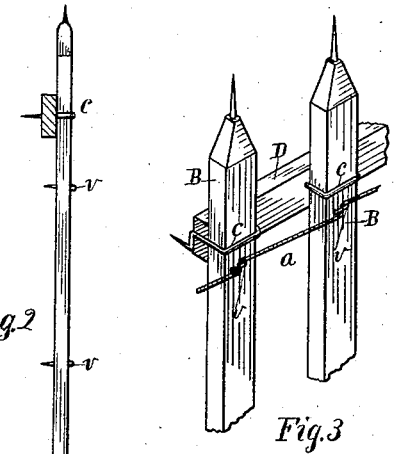
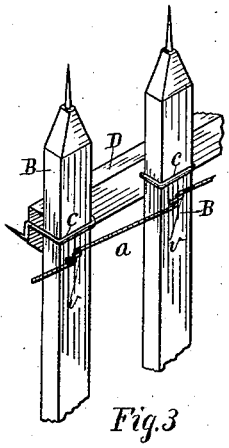
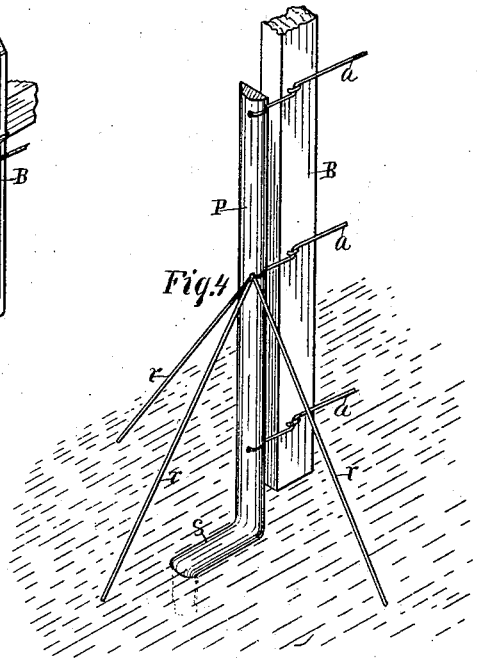
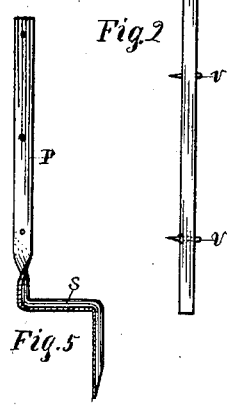
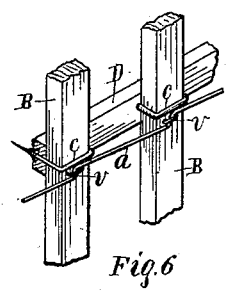
Attest.
John C Perkins
Charles V Chase
Inventor:
Royal C. Eaton
By Lucius C West
Atty

UNITED STATES PATENT OFFICE.

ROYAL C. EATON, OF BRAVO, MICHIGAN.

BARBED PICKET FENCE.

SPECIFICATION forming part of Letters Patent No. 304,630, dated September 2, 1884.

Application filed March 1, 1884. (No model.)

*To all whom it may concern:*

Be it known that I, ROYAL C. EATON, a citizen of the United States, residing at Bravo, county of Allegan, State of Michigan, have invented a new and useful Barbed Picket Fence, of which the following is a specification.

This invention has for its object improved features, hereinafter described and claimed.

In the drawings forming a part of this specification, Figure 1 is a side elevation of a length of the fence; Fig. 2, an end view with post removed; Figs. 3 and 6, broken parts in enlarged perspective; Fig. 4, a perspective view of a post and connections, and Fig. 5 a view of a different form of post.

The posts P are made of half-round metal, provided with an elbow, S, at the lower end, to limit the depth they are to be driven and to assist in supporting them. The anchor wires or rods $r$ $r$ are secured to the post and to pins (not here shown) driven into the ground, Fig. 4. The pickets B are held together by the wires $a$ and barbed staples $v$. The wire where the staple $v$ is located has an oblique-angled portion formed in it, or a kink or loop, to prevent the wire from slipping through the staple. These staples $v$ are provided with beards, as at the lower end of Fig. 2. As many wires $a$ $a$ may be used as may be deemed necessary. Three are here shown in Fig. 1. The pickets B are barbed at the upper end. The staples $v$ terminate through the pickets in barbed ends. A post, P', is centrally located to prevent the length of fence from sagging. It connects with the two lower wires. The pickets B are stayed at the upper end by horizontally-located brace-slats D D. They are provided with loops C, each adapted to receive a picket, B, and terminating through the brace-slat in barbs. The barbed ends may be provided with beards, as in Fig. 6, to secure them, or they may be shouldered, as in Fig. 3. The brace-slats D may be located at any point deemed the most practical, as shown in Fig. 1 in full or by dotted lines in said figure, or as in Figs. 3 and 6.

In Fig. 5 the post P, between the upright portion and the elbow S, has a half-twist, to set the elbow to one side of the fence, instead of at the end, as in Fig. 4. This style is preferred, especially for the central post.

Such a fence is strong and cheaply made, and ornamental as well. It may be used without the barbs, if preferred in any instance; but the barbs make the fence more effectual.

Having thus described my invention, what I claim as new is—

1. A fence composed of the end posts, anchor-wires, pickets, securing-wires connecting the pickets, the central supporting-post, and the brace-slats provided with the loops adapted to receive the pickets, all substantially as set forth.

2. A barbed picket fence consisting of the anchored posts, the pickets and wires secured thereto by the barbed staples, the brace-slats provided with the barbed loops, and the central sustaining-post, all substantially as set forth.

3. A fence composed of the posts, anchor-wires, pickets provided with the upwardly-extending barbs in the upper ends, the connecting-wires and barbed bearded staples, and the brace-slats provided with the barbed and bearded loops, substantially as set forth.

4. A fence composed of the fence-posts, pickets, connecting-wires having the oblique-angled portions, the staples, and the brace-slats provided with the loops, said pickets and slats being provided with barbs, substantially as set forth.

In testimony of the foregoing I have hereunto subscribed my name in the presence of two witnesses.

ROYAL C. EATON.

Witnesses:
CHARLES V. CHASE,
JOHN C. PERKINS.